United States Patent Office 3,103,010
Patented Sept. 3, 1963

3,103,010
PULSE DOPPLER SIMULATOR
Lewis S. Heyser, Linthicum Heights, William A. Skillman, Baltimore, and David H. Mooney, Jr., Glen Burnie, Md., assignors to Westinghouse Electric Corporation, East Pittsburgh, Pa., a corporation of Pennsylvania
Filed Jan. 31, 1957, Ser. No. 637,531
10 Claims. (Cl. 343—17.7)

This invention relates to radar simulators, and more particularly to a simulator of a target having relative motion between it and pulse Doppler radar transmitting and receiving apparatus.

In the testing of a pulse Doppler radar system, it is necessary to generate a signal which is offset by only a small selected frequency, for example, a few kilocycles, from a known microwave frequency. This has been a most difficult problem, and one which no prior art apparatus has satisfactorily solved, prior art devices being complicated or inaccurate.

The apparatus of the instant invention provides simple and accurate means for producing the needed signal of offset frequency by employing a grid controlled klystron amplifier. Operatively connected to the klystron amplifier is a circuit for producing phase modulation by altering the electron transit time a predetermined amount. This is accomplished by changing the cathode voltage on the klystron tube, by superimposing a sawtooth voltage on the direct current supply voltage. The amplitude of the sawtooth voltage is preferably adjusted to produce exactly $2\pi$ radians, whereby the phase of the microwave signal will be changed by one R-F cycle during the slope of the sawtooth voltage. Thus, one R-F cycle of the signal of microwave frequency is added or subtracted for each cycle of the sawtooth voltage, depending upon whether the modulating voltage is a positive or negative going sawtooth. Since the frequency of the sawtooth voltage may be conveniently controlled, the frequency by which the output of the klystron amplifier differs from the input frequency may also be conveniently controlled.

In employing the klystron amplifier and its associated sawtooth wave generator for simulating a pulse Doppler radar target having relative motion to the transmitter and receiver, the transmitted pulse from the pulse Doppler radar apparatus under test is utilized to excite the klystron amplifier, and the output of the klystron amplifier is radiated back to the pulse Doppler radar apparatus under test, where the difference frequency is indicated on the receiver of the pulse Doppler radar.

It is, accordingly, a primary object of the instant invention to provide new and improved radar simulator apparatus.

Another object is to provide new and improved pulse Doppler radar simulator apparatus.

A further object is to provide simulator apparatus employing a klystron amplifier tube and particularly suitable for testing pulse Doppler radar systems.

Still a further object is to provide new and improved pulse Doppler simulator apparatus characterized by ease of control over the output frequency thereof.

Other objects and advantages of the instant invention will become apparent after a perusal of the following detailed description when read in connection with the accompanying drawings, in which.

Figure 3:
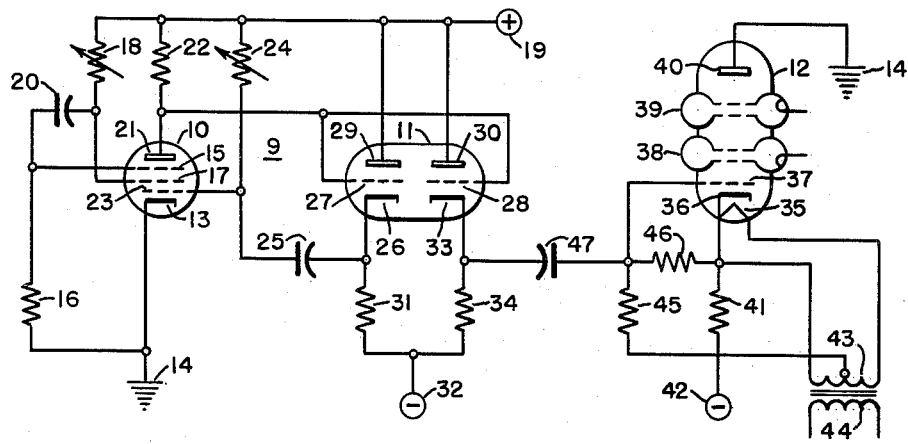
FIG. 3 is a schematic circuit diagram of the sawtooth generator and phase modulating circuit of the instant invention.

Particular reference should be made now to the drawings, in which like reference numerals are used throughout to designate like parts, for a more complete understanding of the invention, and especially to FIG. 3 thereof. Electron discharge tubes 10 and 11, which are preferably of the pentode and dual-triode types respectively, and may be of types known in the trade as 6CL6 and 5687 respectively, and their associated components comprise a circuit for generating a sawtooth voltage and supplying this sawtooth voltage to the klystron tube, generally designated 12, and which is preferably of a two-resonator type, and may be of a type known in the trade as a V-62. Tube 10 has the cathode 13 thereof connected to ground 14. The suppressor or third grid 15 of tube 10 is connected to ground 14 by way of resistor 16 which may have a value of 1 megohm. The second or screen grid 17 of tube 10 is connected by way of resistor 18 which is preferably variable and may have a maximum value of 15 kilohms to the terminal 19 which is connected to a source of direct current potential, not shown, of the order of 250 volts, the other terminal of the direct current source of potential being connected to ground. The junction between grid 17 and resistor 18 is connected by way of capacitor 20 to the aforementioned grid 15, capacitor 20 having a value of, for example, 100 micromicrofarads. The anode 21 of tube 10 is connected by way of resistor 22 which may have a value of 47 kilohms to the aforementioned positive terminal 19. The control grid 23 of tube 10 is connected by way of resistor 24 which is preferably variable and which may have a maximum value of 430 kilohms to the aforementioned positive terminal 19. Grid 23 is also connected by way of capacitor 25 which may have a value of 470 micromicrofarads to the cathode 26 of the aforementioned tube 11. Grids 27 and 28 of tube 11 are both connected to the anode 21 of tube 10. Anodes 29 and 30 of tube 11 are both connected to the aforementioned positive terminal 19. The aforementioned cathode 26 is connected by way of resistor 31 which may have a value of 50 kilohms to terminal 32 which is connected to the negative terminal of an additional source of direct current potential, not shown, of for example, 200 volts, the positive terminal of the last-named source of direct current potential being connected to ground. Cathode 33 of tube 11 is connected by way of resistor 34 which may have a value of 25 kilohms to the aforementioned negative terminal 32.

Any suitable means, not shown, may be employed for heating the cathodes of tubes 10 and 11.

The aforementioned klystron tube 12 has a heater 35, a cathode 36, a control grid 37, a first resonator or buncher 38, a second resonator 39, and a collector element 40 which is connected to ground 14. The aforementioned cathode 36 is connected by way of resistor 41 to a terminal 42, the resistor 41 having a value of, for example, 20 kilohms, and terminal 42 being connected to the negative terminal of a further source of direct current potential, not shown, of the order of 900 volts, the positive terminal of the 900 volt direct current source being connected to ground. One terminal of the heater or filament 35 is connected to the cathode 36, and the heater or filament 35 is connected to the center-tapped secondary 43 of a transformer having the primary 44 thereof connected to a suitable source of alternating current potential, for example, a 110 volt, 60 cycle line.

The center tap of secondary 43 is connected by way of resistor 45 which may have a value of 2.4 kilohms to the aforementioned grid 37. Grid 37 is also connected by way of resistor 46 which may have a value of 56 ohms to the aforementioned cathode 36. Grid 37 is also connected by way of capacitor 47 to the aforementioned cathode 33 of tube 11. Resistors 45 and 46 may be made variable if desired.

The operation of the sawtooth generating portion of the above-described circuit will be readily understood by those skilled in the art, and need not be described in detail. The generator 9 is of the well known phantastron type and is free running. The pentode 10 operates with associated components to function as a Miller integrator. During the cycle of operation the potential of the anode 21 drops below the potential of the third or suppressor grid 15 so that the current through resistor 22 is cut off. Due to this the current through resistor 18 is greatly increased until the potential of the grid 15 is sufficiently reduced to cut off the current through tube 10. When tube 10 is cut off the potential of anode 21 rises and capacitor 20 discharges through resistor 16 to thereby raise the potential of suppressor grid 15 and render tube 10 conductive. The generator then begins another cycle of operation. Variable resistors 18 and 24 provide for adjusting the frequency and amplitude of the sawtooth voltage. The sawtooth voltage is a negative going voltage, and preferably has a rapid flyback.

Figure 2:
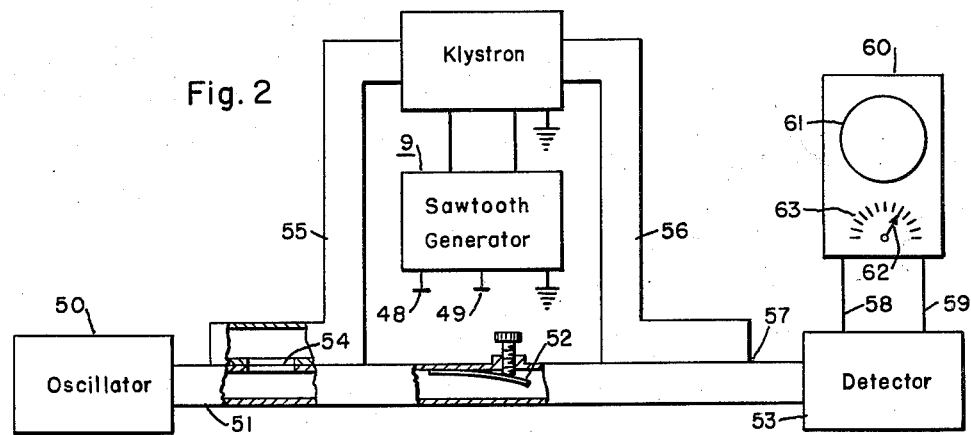
FIG. 2 is a circuit arrangement for adjusting the frequency shift of the klystron amplifier employed in the instant invention.

Particular reference should be made now to FIG. 2. The sawtooth voltage generator generally designated by the reference numeral 9, has controls 48 and 49 preferably associated with the variable components thereof for regulating and controlling the amplitude and frequency respectively of the generated sawtooth voltage. A source of radio frequency oscillations generally designated 50 is provided, it being understood that this source may be a local oscillator as shown in FIG. 2 or, while the klystron is being used for simulating, in a manner to be hereinafter made more clearly apparent, the source of oscillations 50 may be the transmitted pulse from the transmitter of pulse Doppler radar equipment under test. The oscillations from 50 are conducted by waveguide 51 having an attenuator 52 therein to a detector generally designated 53 and hereinafter to be more fully described. A portion of the energy in waveguide 51 is coupled through 54 to waveguide 55, any suitable means, not shown, being employed for coupling waveguide 55 to the aforementioned buncher resonator 38, for example, a coaxial transmission line coupled by any convenient means to the adjacent end of the waveguide 55. Preferably, some attenuation takes place in the energy coupled into the waveguide 55 from waveguide 51, any suitable means, not shown, being provided for obtaining the desired transmission loss.

The aforementioned resonator 39 of klystron 12 is coupled by any convenient means, for example, a short portion of coaxial transmission line, to waveguide 56 which is coupled at coupling 57, which may be similar to coupling 54, back into the waveguide 51 near the aforementioned detector 53. The detector 53 is constructed and arranged to provide on output leads 58 and 59 a voltage or signal having a frequency corresponding to the difference frequency between the frequency of oscillator 50 and the output frequency of the klystron 12. An indicator device 60 is provided which may be an oscilloscope having screen 61 and having a variable frequency sweep generator controlled by knob 62 in accordance with a calibrated scale 63 whereby the frequency on leads 58 and 59 may be read directly from the setting of the knob 62, or the apparatus may be constructed and arranged in a manner whereby the difference frequency appears as amplitude modulation of a chain of pulses, etc.

Figure 4:
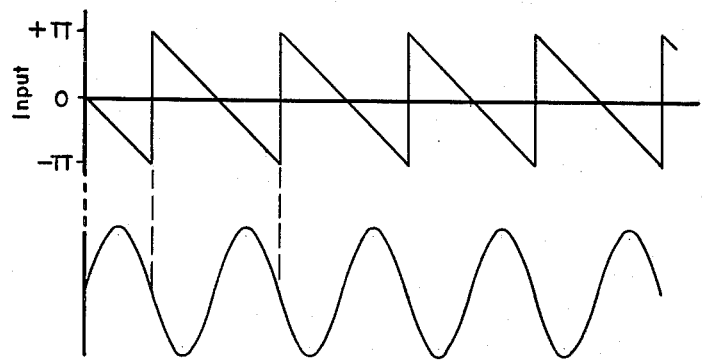
FIG. 4 is a graph illustrating the operation of the circuit of FIG. 3.

In the operation of the apparatus of FIGS. 2 and 3, it should be recalled that the electron transit time in the klystron tube can be altered a significant amount by changing the cathode voltage on the klystron tube. The cathode voltage of tube 12 is periodically altered by superimposing the sawtooth voltage on the direct current supply voltage and the relative phase of the output changes continuously during the fall of the sawtooth voltage. The amplitude of the sawtooth voltage is adjusted to produce exactly $2\pi$ radians, with the result that the phase of the wave is changed by one R-F cycle during the fall of the sawtooth, after which the phase quickly jumps back to its starting point during the flyback. Accordingly, phase modulation is accomplished in which one R-F cycle is subtracted from the frequency in resonator 38 for each cycle of the sawtooth voltage. As aforementioned, preferably the sawtooth voltage has a rapid flyback to reduce the amount of discontinuity in the output wave form. In FIG. 4, to which particular reference is now made, there is shown the modulating wave form and the wave form of the detected difference frequency.

Figure 5:
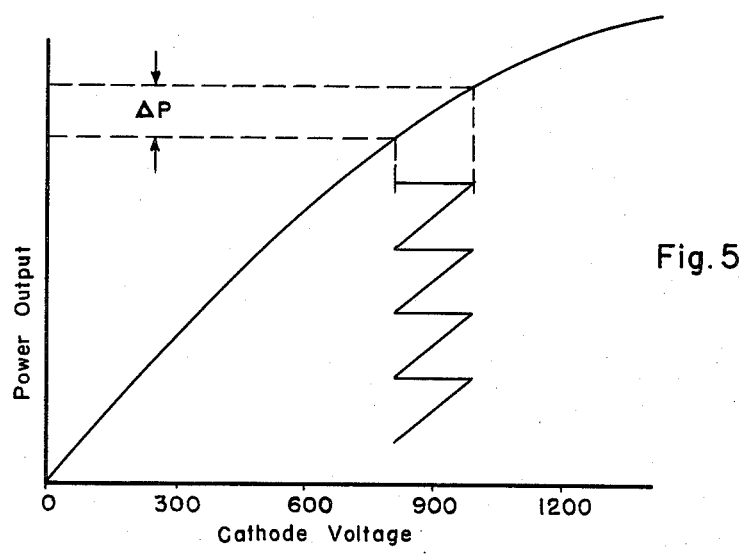
FIG. 5 is an additional graph illustrating the operation of the circuit of FIG. 3.

The application of a sawtooth voltage to the cathode voltage of the klystron would normally cause a periodic increase and decrease in the power output of the klystron, as shown in FIG. 5, where a characteristic curve for a typical klystron shows power output plotted against cathode voltage. Accordingly, there is incorporated in the circuit of FIG. 3 means for substantially eliminating any amplitude modulation resulting from the application of the sawtooth voltage. This is accomplished by feedback or introducing the sawtooth voltage in proper amplitude to the grid of the klystron to thereby hold the gain of the klystron substantially constant over the period of the sawtooth wave and prevent amplitude modulation. In FIG. 3, the resistor 46 controls the amount of feedback.

Preferably circuit means is provided whereby the grid of the klystron is also used to cancel the modulation produced by the alternating current filament or heater voltage of the klystron. Accordingly, a small amount of alternating current voltage of the proper phase for cancellation is introduced on the grid by way of the resistor 45, FIG. 3.

Figure 1:
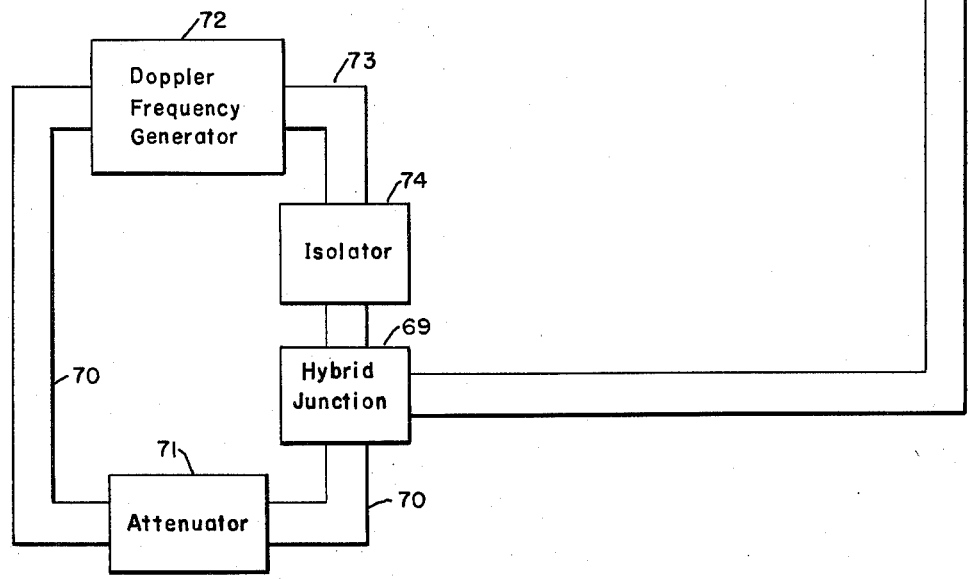
FIGURE 1 is a block diagram of pulse Doppler simulator apparatus according to the instant invention.

Particular attention should be paid now to FIG. 1, in which the pulse Doppler simulator apparatus is shown in block form. The apparatus designated by the block 64 is a pulse Doppler radar transmitter and receiver to be tested, having the antenna 65 connected thereto by waveguide 66. In accordance with the usual practices, the radar apparatus 64 may have receiver means, not shown, including indiactor means, not shown, responsive to a difference in frequency between the transmitted and received waves, in a manner well known to those skilled in the art.

The horn or antenna 67 is preferably calibrated as to its directional pattern and may be movably mounted by any suitable means, not shown. Horn 67 is connected by waveguide 68 to a hybrid junction, generally designated 69. The hybrid junction is constructed and arranged to pass received energy from horn 67 by way of waveguide 70 and attenuator 71 to the first or buncher resonator 38 of klystron tube 12, it being understood that the apparatus contained in the block designated 72 in FIG. 1 and labeled Doppler Frequency Generator comprises the klystron circuit and the sawtooth generator circuit of FIG. 3, and associated apparatus including sources of power. Waveguide 73, FIG. 1, is coupled to output resonator 39 of klystron 12, and supplies energy through the isolator unit generally designated 74 and the aforementioned hybrid junction 69, waveguide 68, to horn 67, where the pulses, now having a radio frequency which differs by a controlled and predetermined amount from the radio frequency of the received pulses are transmitted to antenna 65 thence by way of waveguide 66 to the receiver of the radar apparatus generally designated 64. As aforementioned, the difference frequency may be directly indicated or indicated in terms of any suitable dependent variable by means, not shown, in the radar apparatus 64.

The isolator 74 may conveniently be a commercially available ferrite isolator device, or other suitable isolator device.

In the operation of the hereinbefore described apparatus, the klystron amplifier and sawtooth wave generator may, prior to testing the pulse Doppler radar 64, be connected as shown in FIG. 2, and the apparatus adjusted and calibrated for proper operation utilizing a suitable local source of microwave energy 50. Thereafter, the source 50, detector 53, and associated apparatus may be carefully disconnected from the klystron tube, care being exercised not to disturb the calibration thereof, and the klystron and sawtooth generator connected as shown in FIG. 1. As aforementioned, in FIG. 1, received energy from the radar 64 under test is applied to buncher resonator 38 and the output from resonator 39 is retransmitted back to the radar under test. By this means, a moving radar target is simulated, and the apparatus under test may be calibrated.

The aforementioned calibrated horn 67 may be moved, if desired, to produce any desired pattern of radiation to thereby calibrate and test the sensitivity of the apparatus 64.

Separate transmitting and receiving antennas and separate waveguides could be employed if desired.

Whereas only a negative going sawtooth voltage has been shown and described herein for convenience of illustration, a positive going sawtooth voltage may be employed, if desired, to increase the output frequency one R-F cycle for each cycle of the sawtooth voltage.

Whereas a conventional klystron tube has been shown and described herein for convenience in illustrating the invention, it should be understood that other types of tubes could be employed where phase shifts of at least $2\pi$ radians could be produced; for example, a traveling wave tube could be employed.

Whereas the invention has been shown and described in a preferred embodiment thereof, it should be understood that the apparatus shown and described may be varied by substitution of all known equivalents without departing from the scope of the invention.

We claim as our invention:

1. Pulse Doppler simulator apparatus comprising, in combination, antenna means adapted to transmit and receive pulses of radiant energy of radio frequency, and means operatively connected to said antenna means for producing other pulses from the pulses of energy received by the antenna means, said other pulses differing in radio frequency by a preselected value from the radio frequency of the received pulses, said means for producing other pulses including electron stream tube means with means therein energized by the received pulses for periodically at the radio frequency of the received pulses decelerating some electrons in the stream a predetermined amount while at the same instants accelerating other electrons in the stream a predetermined amount to thereby produce at predetermined places in the stream cyclic variations in electron density, said electron stream tube means including cathode means adapted when a varying voltage is applied thereto to alter the amounts of deceleration and acceleration, sawtooth voltage generator means operatively connected to said cathode means, and additional means in said electron stream tube means for utilizing said cyclic variations in electron density for generating said other pulses, said antenna means transmitting said other pulses.

2. Motion simulating apparatus for use with pulse Doppler radar apparatus in which pulses of energy of radio frequency are employed, the pulse Doppler radar apparatus having transmitting means and receiving means including means for indicating a difference between the radio frequency of the transmitted pulses and the radio frequency of the received pulses, the simulator apparatus comprising, in combination, antenna means for receiving the transmitted pulses from the radar apparatus, klystron tube amplifier means including a tube having a first buncher resonator and a second output resonator, means operatively connected to said antenna means and to said klystron tube amplifier means for energizing said first resonator with said received pulses, frequency shifting means operatively connected to said klystron tube amplifier means for shifting the radio frequency of the pulses of said second output resonator a preselected amount, said frequency shifting means including means for generating a sawtooth voltage of preselected frequency and amplitude, said klystron tube amplifier means including means for utilizing said sawtooth voltage to alter the electron transit time therein a predetermined amount to thereby shift the radio frequency, and means operatively connected to said klystron tube amplifier means for transmitting the pulses of energy of the second output resonator to said antenna means for transmission back to the pulse Doppler radar apparatus.

3. Pulse Doppler simulator apparatus comprising, in combination, antenna means adapted to transmit and receive pulses of radiant energy of radio frequency, and means operatively connected to said antenna means for producing other pulses from the pulses of energy received by the antenna means, said other pulses differing in radio frequency by a preselected value from the radio frequency of the received pulses, said means for generating said other pulses including klystron amplifier means with a klystron tube having a first resonator energized by the received energy and a second resonator for generating said other pulses, and sawtooth voltage generator means operatively connected to said klystron amplifier means, said klystron amplifier means and sawtooth voltage generator means being constructed and arranged to shift the radio frequency of the generated pulses of alternating current energy in said second resonator one cycle for each cycle of said sawtooth voltage, said antenna means transmitting said other pulses.

4. Doppler radar simulator apparatus comprising, in combination: antenna means; two-way radio frequency energy transmitting means operatively connected to said antenna means; generating means operatively connected to said energy transmitting means for generating from energy received by said antenna means energy in the form of a radio frequency alternating current which differs in frequency by a predetermined amount from the radio frequency of said received energy, said generating means including klystron amplifier means with a klystron tube having a first resonator energized by the received energy and a second resonator for generating said generated energy, and sawtooth voltage generator means operatively connected to said klystron amplifier means, said klystron amplifier means and sawtooth voltage generator means being constructed and arranged to shift the radio frequency of the generated alternating current energy one cycle for each cycle of said sawtooth voltage; and means operatively connecting said generating means to said energy transmitting means for supplying said generated energy of different frequency to said antenna means for transmission thereby.

5. Pulse Doppler simulator apparatus comprising, in combination, antenna means adapted to transmit and receive pulses of radiant energy of radio frequency, and means operatively connected to said antenna means for producing other pulses from the pulses of energy received by the antenna means, said other pulses differing in radio frequency by a preselected value from the radio frequency of the received pulses, said means for producing other pulses including klystron amplifier tube means and sawtooth voltage generator means operatively connected to said klystron amplifier tube means to periodically phase modulate the same, said klystron amplifier tube means including means for substantially eliminating amplitude modulation resulting from said sawtooth voltage, said antenna means transmitting said other pulses.

6. In pulse Doppler simulator apparatus, in combination, voltage supplying means for obtaining a first voltage of a first predetermined radio frequency, klystron amplifier means, said klystron amplifier means including a klystron tube having first and second resonators, means operatively connected to said voltage supplying means and to said klystron amplifier means for applying said first voltage to said first resonator, means operatively connected to said klystron amplifier means for causing a second radio frequency voltage in said second resonator which differs in frequency from the radio frequency of said first voltage by a preselected value, detector means operatively connected to said klystron amplifier means and to said voltage supplying means, and indicator means operatively connected to said detector means, said indicator means and detector means being constructed and arranged to indicate the difference in frequency between said first and second radio frequency voltages.

7. In pulse Doppler simulator apparatus, in combination, voltage supplying means for obtaining a first voltage of a first predetermined radio frequency, klystron amplifier means, said klystron amplifier means including a klystron tube having first and second resonators, means operatively connected to said voltage supplying means and to said klystron amplifier means for applying said first voltage to said first resonator, frequency shifting means operatively connected to said klystron amplifier means for causing a second radio frequency voltage in said second resonator which differs in frequency from the radio frequency of said first voltage by a preselected value, said frequency shifting means including means for generating a sawtooth voltage, said last-named means including means for controlling the frequency and amplitude of said sawtooth voltage, detector means, means for applying said first and second radio frequency voltages to said detector means, and indicator means operatively connected to said detector means, said indicator means and detector means being constructed and arranged to indicate the difference in frequency between said first and second radio frequency voltages.

8. In pulse Doppler simulator apparatus, in combination, voltage supplying means for obtaining a first voltage of a first predetermined radio frequency, klystron amplifier means, said klystron amplifier means including a klystron tube having a cathode and first and second resonators, means operatively connected to said voltage supplying means and to said klystron amplifier means for applying said first voltage to said first resonator, frequency shifting means operatively connected to said klystron amplifier means for causing a second radio frequency voltage in said second resonator which differs in frequency from the radio frequency of said first voltage by a preselected value, said frequency shifting means including means for generating a sawtooth voltage, said last-named means including means for controlling the amplitude and frequency of said sawtooth voltage, said klystron amplifier means including means operatively connected to said cathode for utilizing said sawtooth voltage to alter the electron transit time in the tube a preselected amount and thereby vary the frequency of said second radio frequency voltage, detector means, means for applying said first and second radio frequency voltages to said detector means, and indicator means operatively connected to said detector means, said indicator means and detector means being constructed and arranged to indicate the difference in frequency between said first and second radio frequency voltages.

9. In pulse Doppler simulator apparatus, in combination, voltage supplying means for obtaining a first voltage of a first predetermined radio frequency, klystron amplifier means, said klystron amplifier means including a klystron tube having a cathode, a control grid, and first and second resonators, means operatively connected to said voltage supplying means and to said klystron amplifier means for applying said first voltage to said first resonator, frequency shifting means operatively connected to said klystron amplifier means for causing a second radio frequency voltage in said second resonator which differs in frequency from the radio frequency of said first voltage by a preselected value, said frequency shifting means including means for generating a sawtooth voltage and applying said sawtooth voltage to said cathode to periodically alter the operating voltage of the klystron tube, said generating means including means for controlling the frequency and amplitude of said sawtooth voltage, and means operatively connected to said control grid for substantially eliminating amplitude modulation resulting from the application of said sawtooth voltage to said cathode, detector means, means for applying said first and second radio frequency voltages to said detector means, and indicator means operatively connected to said detector means, said indicator means and detector means being constructed and arranged to indicate the difference in frequency between said first and second radio frequency voltages.

10. Pulse Doppler simulator apparatus comprising antenna means for receiving and transmitting signals of different frequencies, frequency generating means operatively connected to said antenna means and having an input adjusted to oscillate at the frequency of said received signals, said generator means also having an output means for producing pulses from the received pulses which vary in frequency from the received pulses by a selected fixed amount, said generator means including means for periodically shifting the generated frequency by a selected fixed amount.

References Cited in the file of this patent

UNITED STATES PATENTS

| | | |
|---|---|---|
| 2,544,255 | Chireix | Mar. 6, 1951 |
| 2,619,543 | Cutler | Nov. 25, 1952 |
| 2,683,855 | Blitz | July 13, 1954 |
| 2,836,813 | Flower et al. | May 27, 1958 |